United States Patent
Shih

(10) Patent No.: US 9,866,443 B1
(45) Date of Patent: Jan. 9, 2018

(54) SERVER DATA PORT LEARNING AT DATA SWITCH

(71) Applicant: QUANTA COMPUTER INC., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/412,994

(22) Filed: Jan. 23, 2017

Related U.S. Application Data

(60) Provisional application No. 62/416,593, filed on Nov. 2, 2016.

(51) Int. Cl.
*H04L 12/24* (2006.01)
*H04L 29/08* (2006.01)

(52) U.S. Cl.
CPC ............ *H04L 41/12* (2013.01); *H04L 69/324* (2013.01)

(58) Field of Classification Search
CPC ............................... H04L 41/12; H04L 69/324
See application file for complete search history.

(56) References Cited

U.S. PATENT DOCUMENTS

| | | | |
|---|---|---|---|
| 2011/0035498 A1* | 2/2011 | Shah | H04L 12/12 709/226 |
| 2011/0179211 A1 | 7/2011 | Li et al. | |
| 2013/0286895 A1* | 10/2013 | Mittapalli | H04L 69/324 370/255 |
| 2016/0014073 A1* | 1/2016 | Reddy | H04L 67/38 713/2 |
| 2016/0234095 A1* | 8/2016 | Shetty | H04L 45/02 |
| 2017/0187686 A1* | 6/2017 | Shaikh | H04L 63/0263 |

FOREIGN PATENT DOCUMENTS

EP 2977889 A1 1/2016

OTHER PUBLICATIONS

Extended European Search Report for EP Application No. 17174952.6, dated Sep. 14, 2017.

* cited by examiner

*Primary Examiner* — Duc C Ho
(74) *Attorney, Agent, or Firm* — Nixon Peabody LLP; Eduardo J. Quinones; Zhou Lu

(57) ABSTRACT

Apparatus and methods are described for configuring data switches with server data port information. In a first embodiment of the invention, a computing device is provided. The computing device includes a network interface controller (NIC) card coupled to a data network, a central processing unit (CPU), and a basic input/output system (BIOS) with a link layer discovery protocol (LLDP) service. In the computing device, the CPU is configured for receiving a signal indicating a change at the NIC card and configuring the CPU to initiate a BIOS session in response to the signal. Further, the BIOS session is configured to allow the BIOS to perform, via the CPU, operations for the LLDP service including transmitting to a data switch of the data network via the NIC card a LLDP packet including information for the NIC card based on the change.

23 Claims, 9 Drawing Sheets

SERVER DATA PORT LEARNING AT DATA SWITCH

CROSS-REFERENCE TO RELATED APPLICATIONS

This application claims priority to and the benefit of U.S. Provisional Application No. 62/416,593, entitled "Mechanisms For Switch Learning Server Data Port MAC Address" and filed Nov. 2, 2016, the contents of which are hereby incorporated by reference in their entirety.

FIELD OF THE INVENTION

The present invention relates to configuration of data switches, and more specifically to apparatus and methods for configuring data switches with server data port information.

BACKGROUND

Maintaining correct network cabling when deploying a data center can be challenging. Traditionally, a network administrator would manually maintain a mapping table to define the relationships between ports at a switch and NIC ports associated with a different server. The reason for maintaining such a mapping table is that without this information, it can be difficult to apply switch port policies to limit server network access capability. For example, if the mapping is unknown, it may be impossible to reliably apply policies for denying specific servers access to network or policies that permit access only to specific servers, since the mapping between switch ports and particular servers is unknown.

Some efforts have been made to address these issues. For example, one proposed framework is the Rack Scale Design (RSD) framework. The RSD framework relies on so-called Pooled System Management Engine (PSME) software for performing discovery. The PSME Software is a bundle of applications working and communicating together to manage and control different assets. Typically, the PSME Software consists of a PSME Representational State Transfer (REST) server, which is a server responsible for gathering and presenting information about assets and available operations on these assets. The PSME REST server typically connects with at least the following agents: (1) a PSME Compute agent which is responsible for gathering detailed information about compute modules and for controlling hosts and (2) a PSME Network agent which is responsible for configuration and gathering of detailed information about the network topology.

In the RSD framework, the network topology can be discerned using a Link Layer Discovery Protocol (LLDP). For example, an agent in the RSD framework can receive neighbor information from a LLDP agent (e.g., an Open-LLDP daemon). The agents always communicate between each other thru mesh links. Thus, the neighbor port information can be retrieved only on this port type. However, this configuration assumes that all components utilize or support LLDP. Thus, in cases where a server operating system fails to support LLDP, the portion of the topology associated with the non-LLDP server cannot be discerned.

SUMMARY

Embodiments of the invention concern apparatus and methods for configuring data switches with server data port information. In a first embodiment of the invention, a computing device is provided. The computing device includes a network interface controller (NIC) card coupled to a data network, a central processing unit (CPU), and a basic input/output system (BIOS) with a link layer discovery protocol (LLDP) service. In the computing device, the CPU is configured for receiving a signal indicating a change at the NIC card and configuring the CPU to initiate a BIOS session in response to the signal. Further, the BIOS session is configured to allow the BIOS to perform, via the CPU, operations for the LLDP service including transmitting to a data switch of the data network via the NIC card a LLDP packet including information for the NIC card based on the change.

In some configurations, the signal can be a system management interrupt and the BIOS session can be a system management mode (SMM) of the CPU. Further, the signal can be received from the NIC card.

In some configurations, the computing device can include a management controller configured for monitoring the NIC card, and the signal can be received from management controller.

In a second embodiment of the invention, a method in a computing device, where the computing device has a network interface controller (NIC) card coupled to a data network, a central processing unit (CPU), and a basic input/output system (BIOS) with a link layer discovery protocol (LLDP) service, is provided. The method can include receiving, at the CPU, a signal indicating a change at the NIC card and initiating, at the CPU, a BIOS session in response to the receiving of a signal. In the method, the BIOS session is configured to allow the BIOS to perform, via the CPU, operations for the LLDP service including transmitting to a data switch of the data network via the NIC card a LLDP packet including information for the NIC card based on the change.

In some configurations, the signal can be a system management interrupt and the BIOS session can be a system management mode (SMM) of the CPU. Further, the signal can be received from the NIC card. Further, the signal can be received from the NIC card.

In some configurations, the computing device can include a management controller configured for monitoring the NIC card, and the signal can be received from management controller.

In a third embodiment of the invention, a computing device is provided. The computing device includes a network interface controller (NIC) card coupled to a data network and a management controller with a link layer discovery protocol (LLDP) service. In the computing device, the LLDP is configured for causing the NIC card to route traffic for the NIC card to the management controller, extracting NIC card information from the traffic, and causing the NIC card to transmit to a data switch of the data network, via the NIC card, a LLDP packet including the NIC card information.

In the computing device, the NIC card information can be an NIC card media access control (MAC) address.

In the computing device, the transmitting can include detecting a trigger event and performing the transmitting in response to the trigger event. The trigger event can be at least one of a power off state for the computing device, a power on state for the computing device, or a change at the NIC card. Further, the NIC card information can be transmitted continuously.

In the computing device, the causing can include establishing a communications session between the management controller and the NIC card for the routing of the traffic.

Further, the communications session between the management controller and the NIC card includes one of a Network Controller Sideband Interface (NC-SI) over Reduced Media Independent Interface Based Transport (RBT) session, a Management Component Transport Protocol (MCTP) over System Management Bus (SMBus) session, or a MCTP over Peripheral Component Interconnect Express (PCIe) session.

In a fourth embodiment of the invention, a computing device having a network interface controller (NIC) card coupled to a data network and a management controller with a link layer discovery protocol (LLDP) service, the method including, performing, via the LLDP service of the management controller, the steps of configuring the NIC card to route traffic for the NIC card to the management controller, extracting NIC card information from the traffic, and transmitting, via the NIC card, a LLDP packet including the NIC card information to a data switch of the data network.

In the computing device, the NIC card information can be an NIC card media access control (MAC) address.

In the computing device, the transmitting can include detecting a trigger event and performing the transmitting in response to the trigger event. The trigger event can be at least one of a power off state for the computing device, a power on state for the computing device, or a change at the NIC card. Further, the NIC card information can be transmitted continuously.

In the computing device, the causing can include establishing a communications session between the management controller and the NIC card for the routing of the traffic. Further, the communications session between the management controller and the NIC card includes one of a Network Controller Sideband Interface (NC-SI) over Reduced Media Independent Interface Based Transport (RBT) session, a Management Component Transport Protocol (MCTP) over System Management Bus (SMBus) session, or a MCTP over Peripheral Component Interconnect Express (PCIe) session.

DETAILED DESCRIPTION

Figure 1:
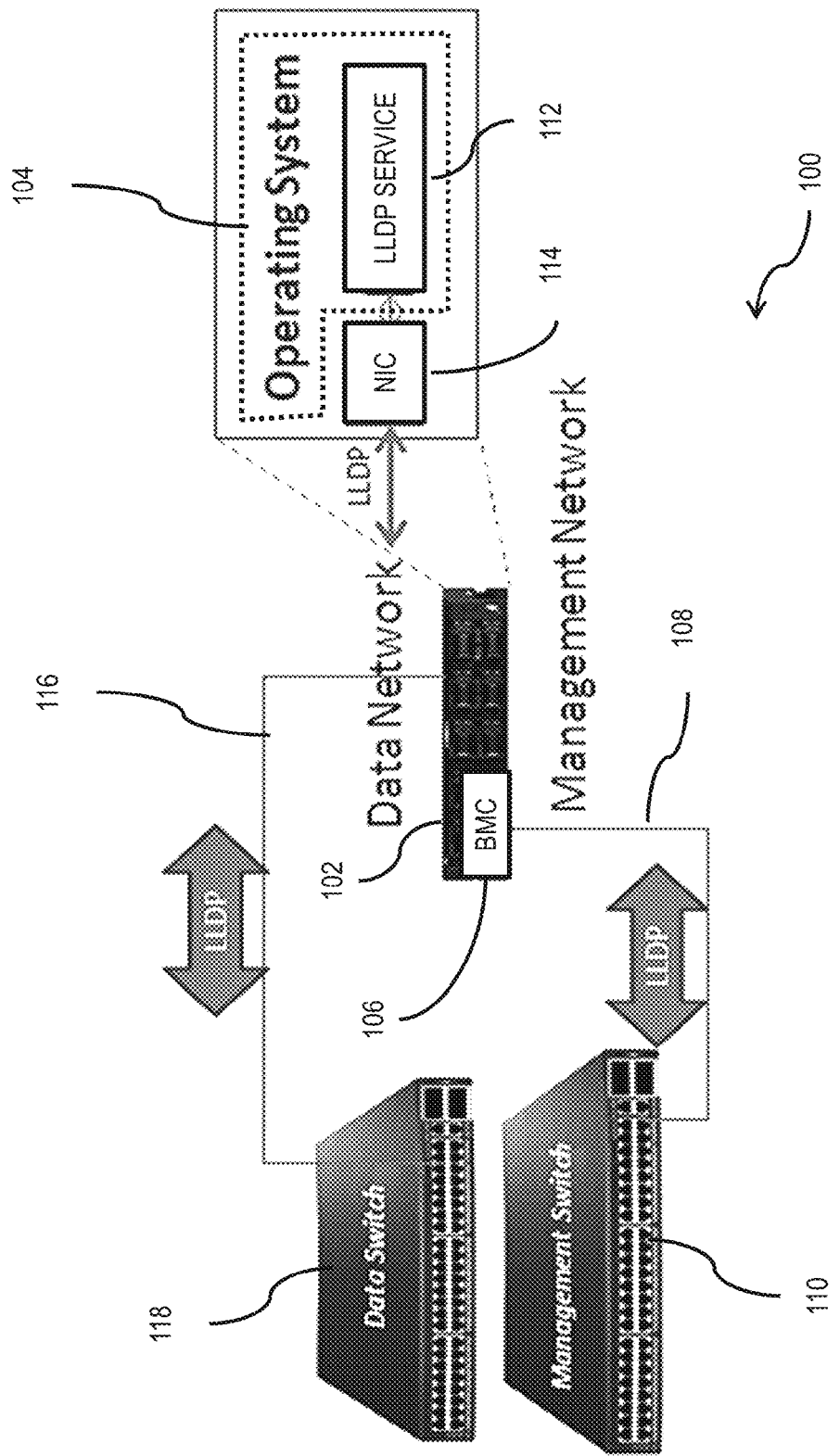
FIG. 1 shows a server configuration that is useful for understanding the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, a conventional method for ensuring that changes in network data ports (i.e., changes for a data NIC card) are communicated to a data switch is to build-in a LLDP service into the operating system of the server associated with this NIC card. This configuration is illustrated in FIG. 1.

FIG. 1 shows a server configuration 100 that is useful for understanding the various embodiments. As shown in FIG. 1, the server configuration includes a server 102 with a management controller 106, such as a baseboard management controller (BMC), coupled to a management network 108 and a management switch 110. In the configuration of FIG. 1, the management controller 106 and the management switch 110 implement a LLDP framework, i.e., an exchange of LLDP packets, so that the management switch 110 is aware of the MAC address associated with the BMC 106.

The server 102 also includes an operating system (O/S) 104 and a data NIC card 114, which connects to a data network 116 and a data switch 118. In the configuration of FIG. 1, the O/S 104 can control the NIC card 114 using an LLDP service 112 so that the O/S 104 and the data switch 118 implement an LLDP framework, i.e., an exchange of LLDP packets, so that the data switch 110 is aware of the MAC address associated with the NIC card 114 of the server 102.

LLDP, as used herein to identify services, frameworks, packets, or other components, can mean the data link layer protocol formally referred to by the IEEE as Station and Media Access Control Connectivity Discovery, as specified in IEEE 802.1AB and IEEE 802.3-2012 section 6 clause 79. However, LLDP can also refer to any other data link layer protocols that are variations of the formal LLDP or other data link layer protocols providing similar functionality as the formal LLDP, including any other vendor neutral or proprietary data link layer protocols. For example, LLDP functionality, formal or otherwise, can include, but it not limited to, delivery of server NIC card information, such as a media access control address (MAC address) associated with the NIC card, a universally unique identifier (UUID) associated with NIC card, or any other unique identifying information associated with the NIC card.

As previously noted, a deficiency of the configuration of FIG. 1 is that in order to implement the LLDP framework, the O/S 104 must be configured to include the LLDP service 112. Thus, if the server O/S lacks a LLDP service, it would not operate properly in a datacenter using LLDP. Another deficiency of the configuration of FIG. 1 is that the configuration is insecure. That is, the LLDP service 112 in the O/S 104 is susceptible to modification. As a result, the modified LLDP service could be used to send LLDP packets that so as to deceive the data switch 118 and circumvent any switch access control policies currently in place.

In view of the limitations of conventional LLDP configurations, the various embodiments implement an LLDP framework that does not rely on an LLDP service being implemented in a server O/S. An exemplary configuration is illustrated in FIG. 2.

Figure 2:
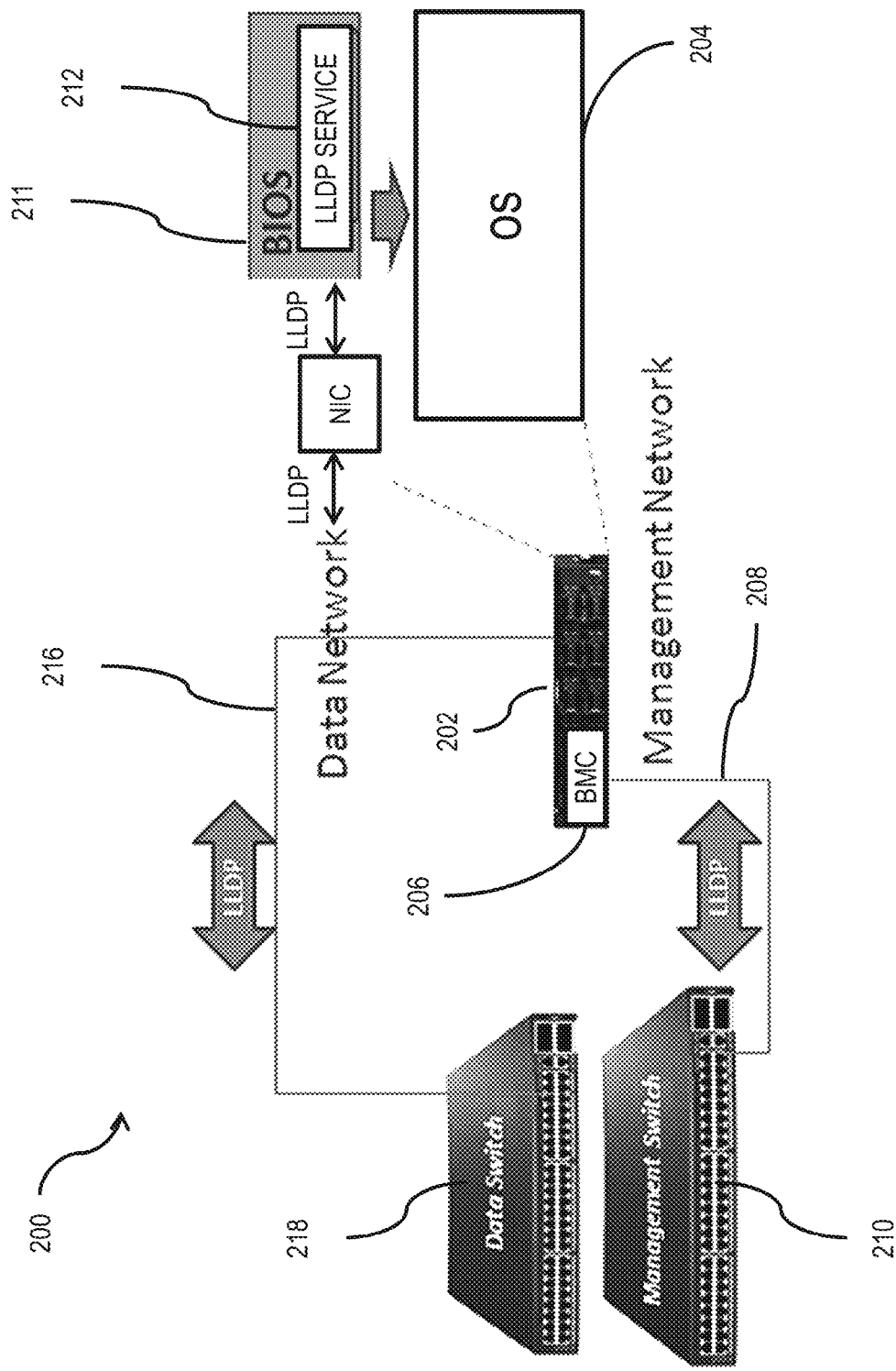
FIG. 2 shows a server configuration according to an embodiment of the invention.

FIG. 2 shows a server configuration 200 according to an embodiment of the invention. As shown in FIG. 2, the server configuration includes a server 202 with a management controller 206, such as a BMC, coupled to a management network 208 and a management switch 210. In the configuration of FIG. 2, the management controller 206 and the management switch 210 implement a LLDP framework, i.e., an exchange of LLDP packets, so that the management switch 210 is aware of the MAC address associated with the management controller 206.

The server 202 also includes an O/S 204, a basic input/output system (BIOS) 211, and a NIC card 214. In the server configuration of FIG. 2, instead of installing the LLDP service in the O/S 204, an LLDP service 212 can be incorporated into the BIOS 211. In operation, the BIOS 211 would execute the LLDP service 212, which would provide LLDP packets, via NIC card 214 to data network 216 and a data switch 218, whereby any changes at NIC card 214 are communicated to data switch 218.

Such a configuration provides a means for implementing LLDP at a server without requiring customizing of the O/S, i.e., force use of LLDP, and provides enhanced security to prevent circumvention of access policies. That is, since a BIOS image would normally be provided by a server vendor and is not as easily customized by the end user as the O/S software, there is a lower likelihood of an end user tampering with the server to illicitly obtain access.

However, since LLDP 212 service in the BIOS 211 would only be executed when the server 202 is booted, no further updates can be provided to the data switch without rebooting. For example, if after rebooting a network cable is switched to a different port, then there is no active LLDP service available to provide updated MAC information to the data switch. Further, adding an O/S based LLDP service to supplement the BIOS-based LLDP service would not be the ideal since the O/S-based service has several issues, as previously noted. However, the present disclosure contemplates that the server configuration of FIG. 2 can be instead supplemented in other ways. A first potential configuration is discussed below with respect to FIGS. 3 and 4.

Figure 3:
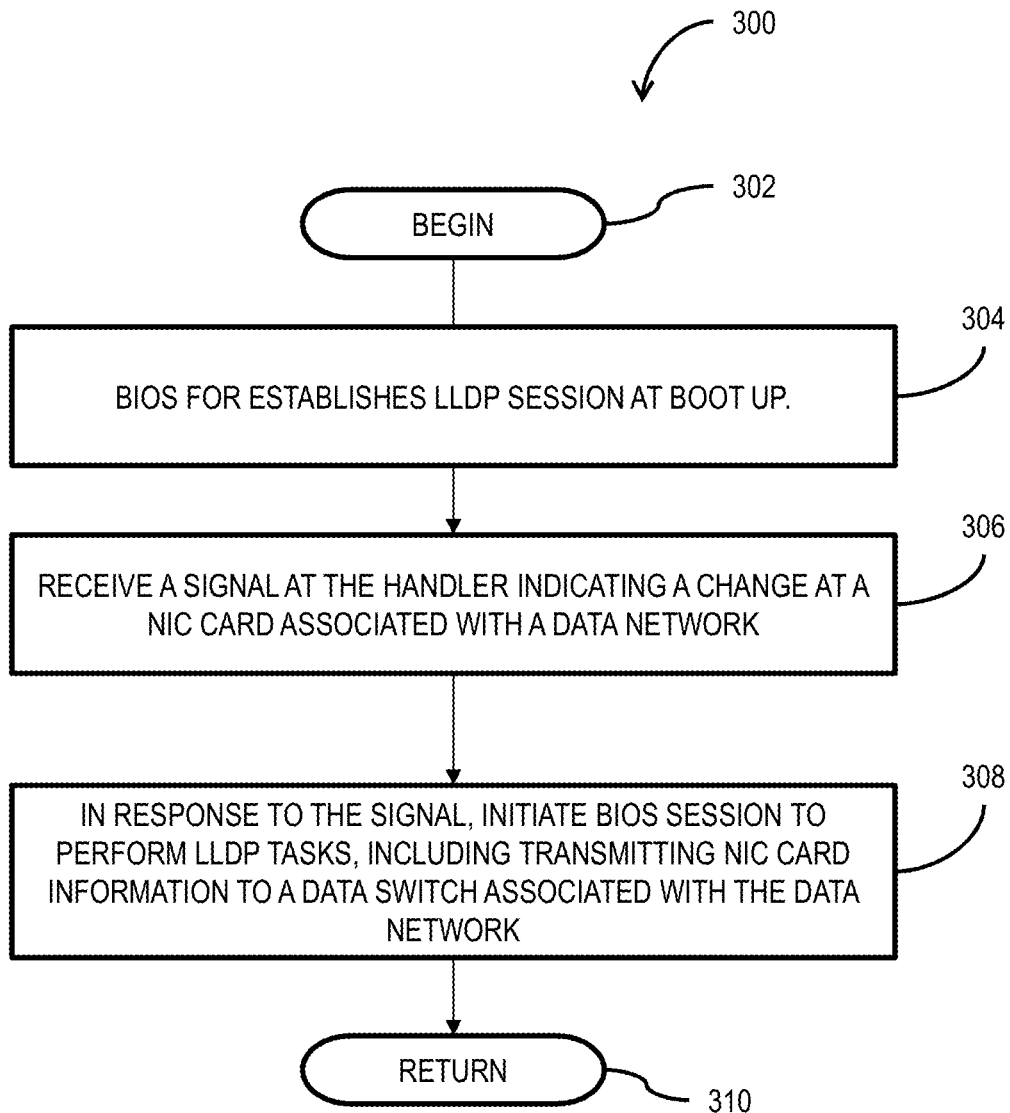
FIG. 3 is flowchart of steps in an exemplary method for enforcing LLDP in a server configuration.
Figure 4:
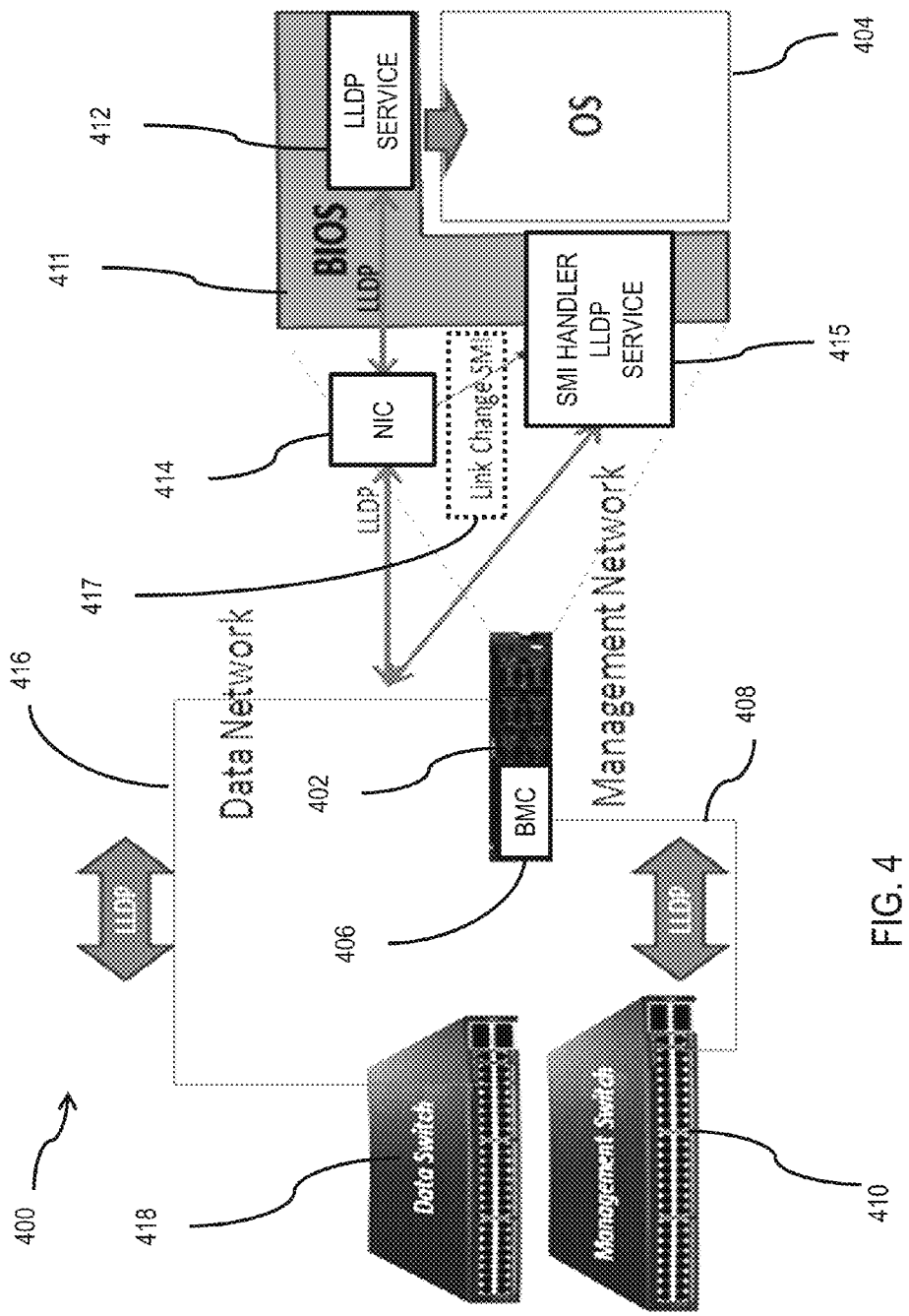
FIG. 4 shows one exemplary server configuration for implementing the method of FIG. 3.

FIG. 3 is flowchart of steps in an exemplary method 300 for enforcing LLDP in a server configuration. FIG. 4 shows one exemplary server configuration 400 for implementing the method 300 of FIG. 3.

Referring first to FIG. 4, the server configuration 400 is similar to that of FIG. 2. As shown in FIG. 4, the server configuration includes a server 402 with a management controller 406, such as a BMC, coupled to a management network 408 and a management switch 410. In the configuration of FIG. 4, the management controller 406 and the management switch 410 implement a LLDP framework, i.e., an exchange of LLDP packets, so that the management switch 410 is aware of the MAC address associated with the BMC 406.

The server 402 also includes an O/S 404, a basic input/output system (BIOS) 411, and a NIC card 414. In the server configuration of FIG. 4, instead of installing the LLDP service in the O/S 404, an LLDP service 412 can be incorporated into the BIOS 411. In operation, the BIOS 411 would execute the LLDP service 412, which would provide LLDP packets, via NIC card 414 to data network 416 and a data switch 418, whereby any changes at NIC card 414 are communicated to data switch 418.

In the server configuration 400 in FIG. 4, as in the configuration 200 of FIG. 2, an LLDP service 412 can be incorporated into the BIOS 411. In operation, the BIOS 411 would execute the LLDP service 412, which would provide LLDP packets at boot-up to data network 416 and a data switch 418, whereby any changes at NIC card 414 are communicated to data switch 418.

In addition to the foregoing components, the server configuration 400 is also configured for detecting changes at the NIC card 414 after boot-up and communicating such information to the data switch 418 without the need for an O/S based solution. This can be performed in several ways.

In one implementation, the NIC card 414 can include a detection circuit. The detection circuit can be configured to detect a change at the NIC card 414 and generate a signal 417 to trigger an LLDP packet being generated for the data switch 418. For example, the detection circuit can be configured to generate a system management interrupt (SMI) that can be used to trigger the LLDP packet generation. However, the various embodiments are not limited in this regard and the detection circuit can be configured to generate any other type of signal. Further, although the detection circuit is described as being incorporated into the NIC card 414, the present disclosure contemplates that the detection circuit can be integrated into some other component of the server 402 or even be a standalone component of the server 402.

In another implementation, the management controller 406 can be configured to monitor the operation of the NIC card 414. Similar to the detection circuit, the management controller 406 can also be configured to detect a change at the NIC card 414 and generate a signal to trigger an LLDP packet being generated for the data switch 418. For example, the management controller 406 can also be configured to generate a system management interrupt (SMI) that can be used to trigger the LLDP packet generation. However, the various embodiments are not limited in this regard and the detection circuit can be configured to generate any other type of signal.

The server 402 would also include a handling component 415 for receiving the signal from a detection circuit or a management controller 406. The handling component 415 can also be used to trigger the BIOS 411 to be executed while the O/S 404 is running, so that the appropriate LLDP packet is forwarded to the data switch 418 to update MAC address information or any other information regarding the NIC card 414.

In implementations where the signal generated is a SMI, the handling component 415 can be a SMI handler for the LLDP service 412. Such functionality can be incorporated, for example into the CPU of the server 402. In operation, the CPU can be triggered, in response to the SMI, to initiate a system management mode (SMM) to provide a protected memory space for the BIOS 411 to execute the LLDP service 412 in order to generate the LLDP packet for the data switch 418.

In some embodiments, in addition to the triggers based on detection, other triggers can be implemented as well. In some cases, triggers can be based on the state of the server. For example, in a server with power management features, the trigger can be entering a power-on or power-off state, such as entering or exiting a sleep or low power mode. For example, even if the NIC card remains the same, the BIOS can be configured to send an LLDP packet as part of the boot-up phase, even if there are no changes at the NIC card.

In other configurations, the trigger can be a timer-based trigger. For example, the BMC can be configured to generate a signal a predefined intervals to cause the BIOS-based LLDP service to be executed periodically. Such as by generating an SMI at regular intervals. However, these triggers are discussed by way of example, not by way of limitation and the present disclosure contemplates that other triggers can be used.

Referring back to method 300 in FIG. 3, the operation of the server configuration 400 of FIG. 4 is described in greater detail. Method 300 begins at step 302 and continues on to step 304. At step 304, the BIOS establishes an LLDP session at boot-up. That is, as described above with respect to FIG. 4, the BIOS 411 executes the LLDP service 412 when the server 402 is booted up. This causes the LLDP service 412 to obtain information about the NIC card 414 and forward a LLDP packet to the data switch 418.

After this initial step 304, the method proceeds to step 306. At step 306, during normal operation (i.e, after boot-up), the handler 415 may receive a signal indicating a change at the NIC card 414. For example, as discussed above, an SMI can be generated in response to a change in the NIC card 414.

Once the signal is received at step 306, the method 300 proceeds to step 308. At step 308, a session with the BIOS can be initiated so that the LLDP service 412 can perform LLDP tasks, such as transmitting an LLDP packet to the data switch 418 via the NIC card 414. For example, as discussed above, in response to the receipt of the SMI, the CPU can initiate an SMM for the BIOS 411 to execute the LLDP service 412.

Once the LLDP tasks are completed at step 308, the method 300 can proceed to step 310 and resume previous processing, including repeating method 300.

In the method and configuration shown in FIGS. 3 and 4, the performance of LLDP tasks relies entirely on such tasks being performed by the BIOS, either at boot-up or during a SMM or other mode for executing the BIOS. However, the present disclosure contemplates that in some configurations, post-boot LLDP tasks can be performed by a management controller acting as a proxy for the BIOS. This is illustrated in FIGS. 5-8.

Figure 5:
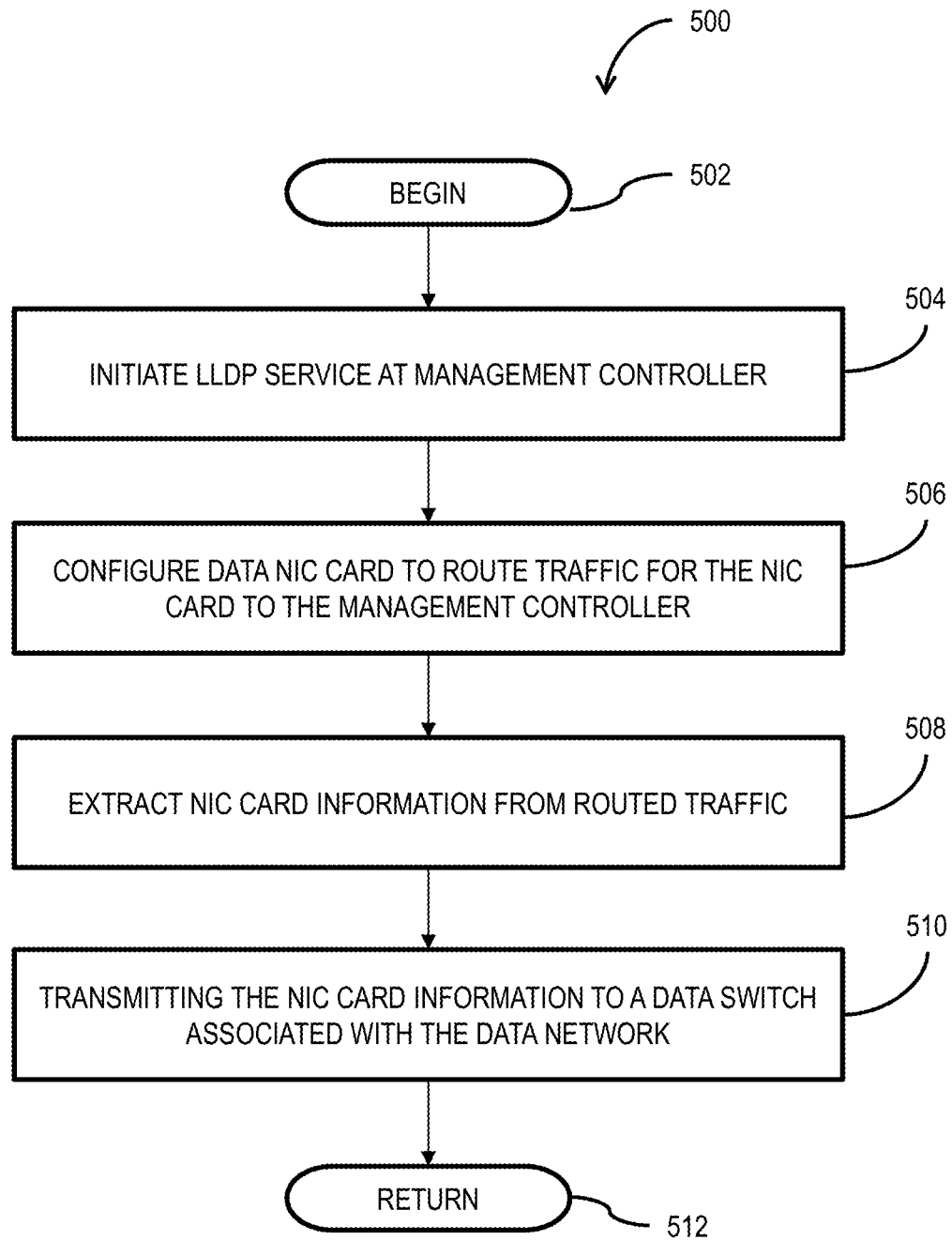
FIG. 5 is flowchart of steps in another exemplary method for enforcing LLDP in a server configuration.

FIG. 5 is a flowchart of steps in an exemplary method 500 for enforcing LLDP in a server configuration via a management controller. Method 500 begins at step 502 and continues to step 504. At step 504, the LLDP service is initiated at the management controller after boot-up of the server. For example, referring to FIG. 6, there is shown server configuration 600 configured for implementing method 500.

Figure 6:
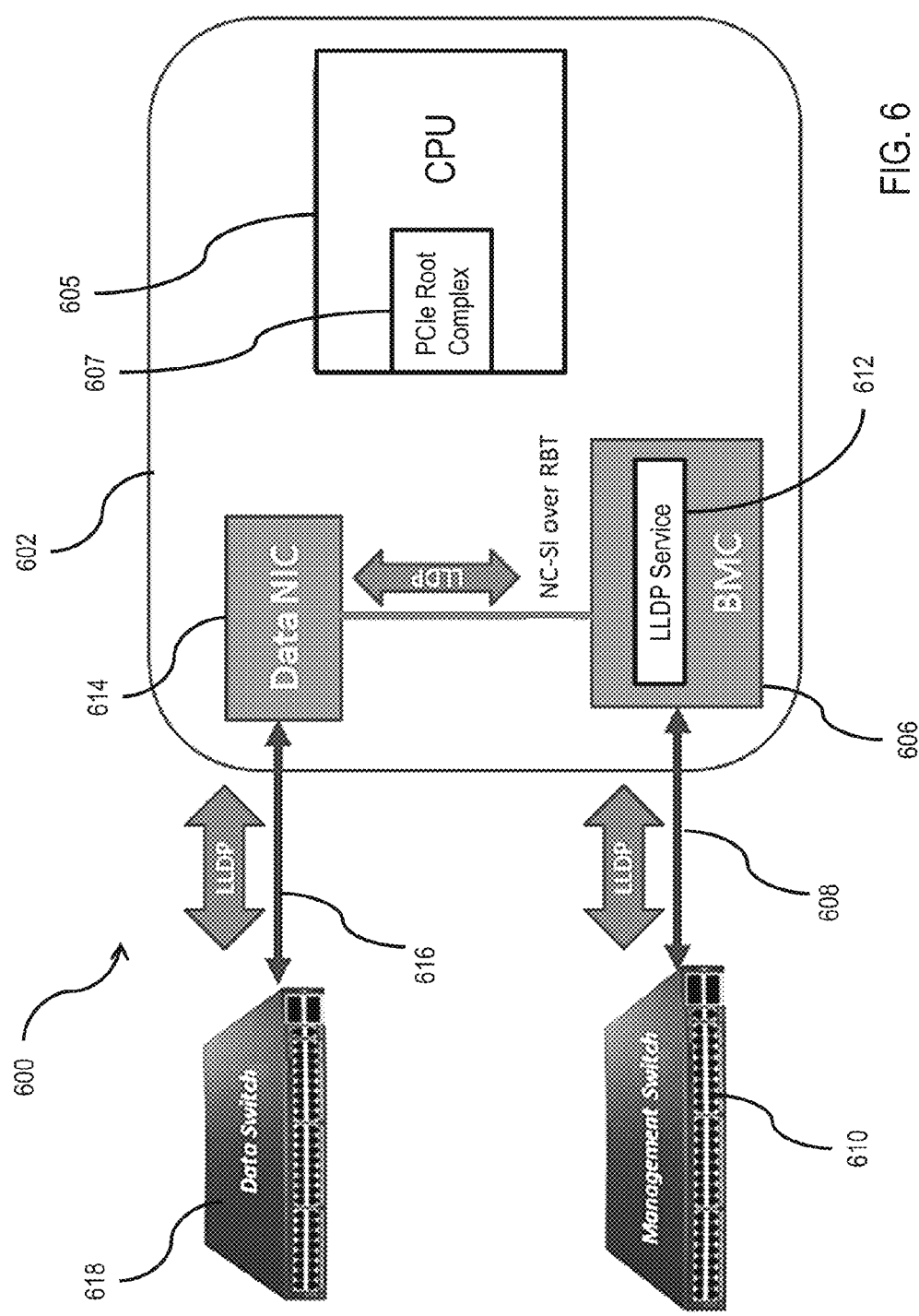
FIG. 6 shows a first exemplary server configuration for implementing the method of FIG. 5.

As shown in FIG. 6, the server configuration includes a server 602 with a management controller 606, such as a BMC, coupled to a management network 608 and a management switch 610. In the configuration of FIG. 6, the management controller 606 and the management switch 610 implement a LLDP framework, i.e., an exchange of LLDP packets, so that the management switch 610 is aware of the MAC address associated with the management controller 606.

The server 602 also includes a CPU 605, which can be configured to implement PCIe root complex, BIOS (not shown), and a NIC card 614. In the server configuration of FIG. 6, instead of installing the LLDP service in the O/S, an LLDP service 612 can be incorporated into the management controller 606. In operation, the management controller 606 would execute the LLDP service 612, which would provide LLDP packets, via NIC card 614 to data network 616 and a data switch 618, whereby any changes at NIC card 614 are communicated to data switch 618. In the exemplary configuration of FIG. 6, the NIC card 614 is shown as being directly coupled to the management controller 606 via a Network Controller Sideband Interface (NC-SI) over a Reduced Media Independent Interface (RMII) Based Transport (RBT) protocol ("NC-SI over RBT"). However, the present disclosure contemplates other configurations for establishing a communications link between the NIC card 614 and the management controller 606, as discussed in further detail below.

Referring back to FIG. 5, once the LLDP service is initiated at the management controller 606 at step 504, the method proceeds to step 506. At step 506, the management controller 606 establishes a communications link with the NIC card 614 and configures the NIC card 614 to route all traffic and updated information for the NIC card 614 through the management controller 606. For example, as discussed above with respect to FIG. 6, the management controller 606 can establish a NC-SI over RBT direct connection with the NIC card 614 for such configuring and exchange of information. Thereafter, at step 508, the management controller can extract NIC card information from the routed traffic and other information.

Once the information is extracted at step 508, the NIC card can be configured at step 510 to transmitting NIC card information to the data switch. For example, referring back to FIG. 6, packets and other information from the NIC card 614 can be routed to the management controller 606. The LLDP service 612 at the management controller 606 can then analyze the received data, extract any information to be transmitted to the data switch 618, then cause the NIC card 614 to transmit and LLDP packet to the data switch 618 containing the NIC card information.

In some embodiments, the LLDP service 612 can be configured to cause the NIC card 614 to transmit such LLDP packets on a regular basis or according to some schedule. In other configurations, the LLDP service 612 can be configured to cause the NIC card 614 to transmit such LLDP packets only when a change in the NIC card information is detected. In still other configurations, a combination of approaches can be used. That is, NIC card information can be transmitted regularly, but when an update in the NIC card information is detected, the LLDP packet indicating such an update can be transmitted immediately. Thereafter, the scheduled transmissions can be resumed.

Referring back to FIG. 5, once the NIC card information is transmitted to the data switch at step 510, the method can resume previous processing, including repeating method 500 or any portions of method 500. For example, since the LLDP service is already initiated, method 500 can repeat starting at step 506 instead of step 502.

As discussed above, the management controller 606 and the NIC card 614 can communicate in a variety of ways. For example, as discussed about with respect to FIG. 6, the communications link can communicate using NC-SI over RBT. Another alternative method is to configure the management controller 606 and the NIC card 614 to communicate using Management Component Transport Protocol (MCTP) over a System Management Bus (SMBus)("MCTP over SMBus"). Such a configuration is illustrated in FIG. 7.

Figure 7:
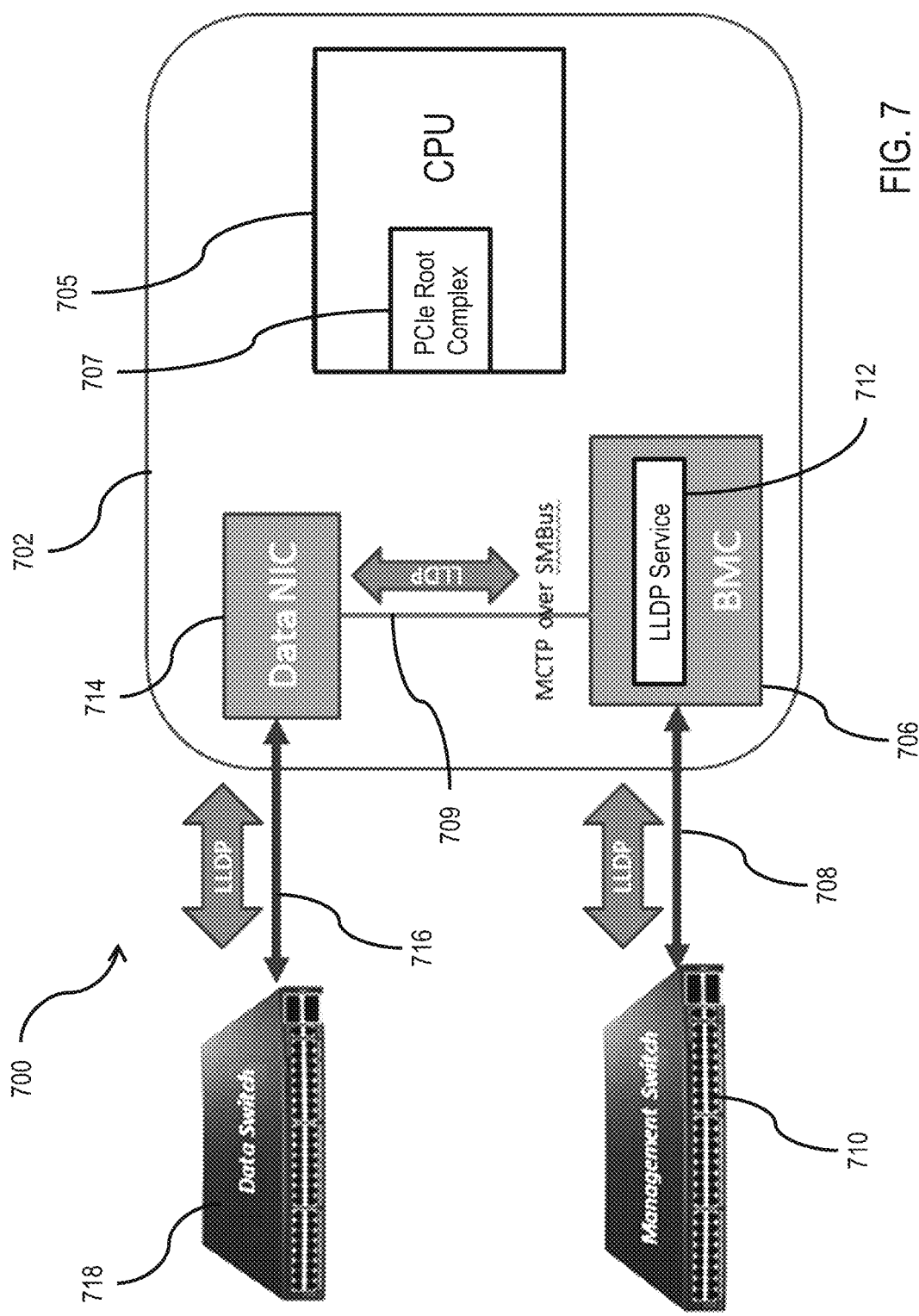
FIG. 7 shows a second exemplary server configuration for implementing the method of FIG. 5.

As shown in FIG. 7, the server configuration 700 includes a server 702 with a management controller 706, such as a BMC, coupled to a management network 708 and a management switch 710. In the configuration of FIG. 7, the management controller 706 and the management switch 710 implement an LLDP framework, i.e., an exchange of LLDP packets, so that the management switch 710 is aware of the MAC address associated with the management controller 706.

The server 702 also includes a CPU 705, which can be configured to implement PCIe root complex, BIOS (not shown), and a NIC card 714. In the server configuration of FIG. 7, instead of installing the LLDP service in the O/S, an LLDP service 712 can be incorporated into the management controller 706, similar to the configuration of FIG. 6. In operation, the management controller 706 would execute the LLDP service 712, which would provide LLDP packets, via NIC card 714 to data network 716 and a data switch 718, whereby any changes at NIC card 714 are communicated to data switch 718. In the exemplary configuration of FIG. 7, the NIC card 714 is shown as being directly coupled to the management controller 706 via MCTP over SMBus.

Figure 8:
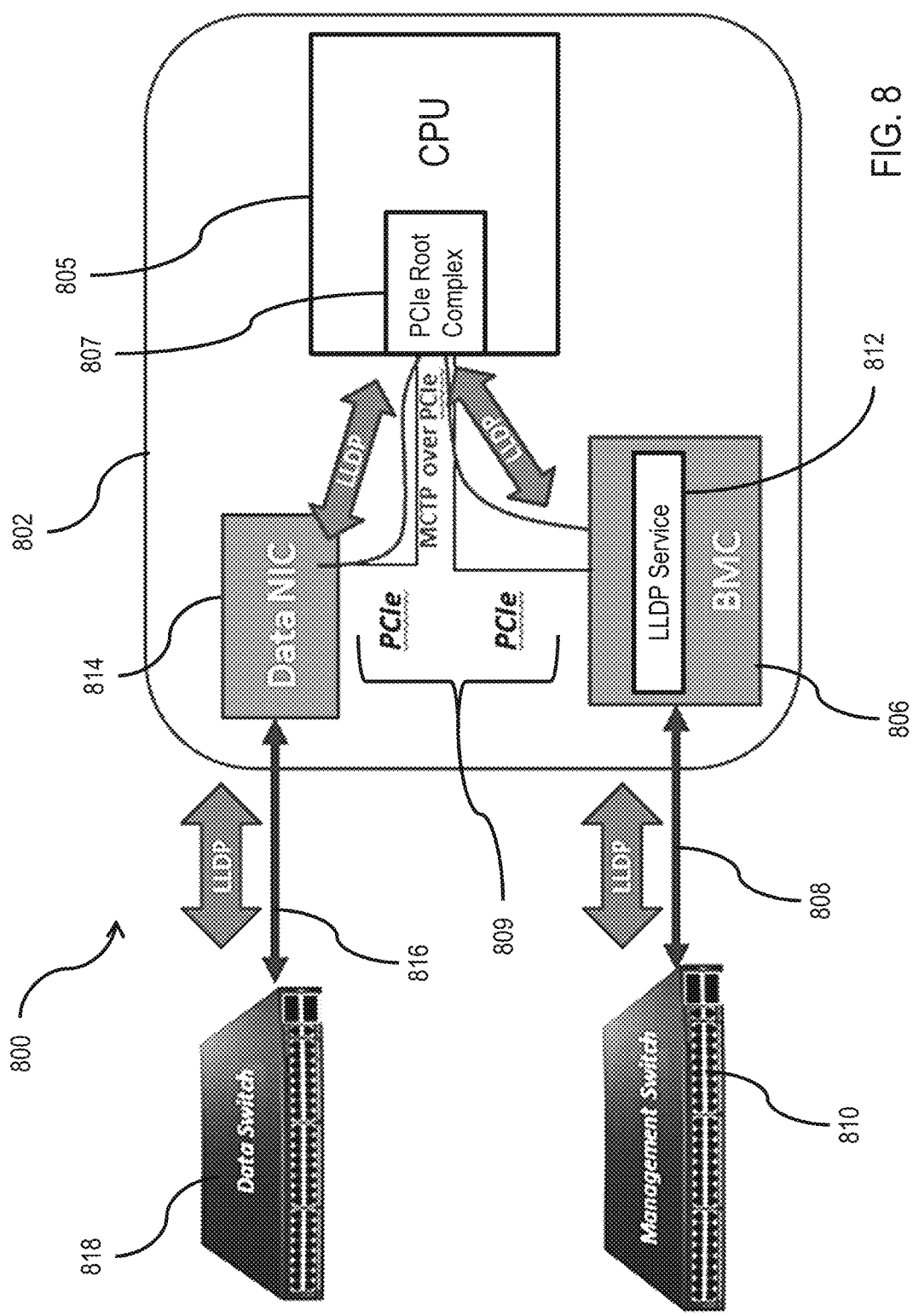
FIG. 8 shows a third exemplary server configuration for implementing the method of FIG. 5.

In some configurations, a direct connection is not necessary. For example, as illustrated by the server configuration 800 in FIG. 8. As shown in FIG. 8, the server configuration 800 includes a server 802 with a management controller 806, such as a BMC, coupled to a management network 808 and a management switch 810. In the configuration of FIG. 8, the management controller 806 and the management switch 810 implement a LLDP framework, i.e., an exchange of LLDP packets, so that the management switch 810 is aware of the MAC address associated with the management controller 806.

The server 802 also includes a CPU 805, which can be configured to implement PCIe root complex, BIOS (not shown), and a NIC card 814. In the server configuration of FIG. 8, instead of installing the LLDP service in the O/S, an LLDP service 812 can be incorporated into the management controller 806, similar to the configuration of FIG. 6. In operation, the management controller 806 would execute the LLDP service 812, which would provide LLDP packets, via NIC card 814 to data network 816 and a data switch 818, whereby any changes at NIC card 814 are communicated to data switch 818.

In the exemplary configuration of FIG. 8, in contrast to the configurations of FIGS. 6 and 7, the NIC card 814 is not directly coupled to the management controller 806. Rather, in server configuration 800, the fact that the NIC card 814 and the management controller 806 are both configured to communicate with other components using PCIe Root Complex 807 is leveraged. In particular, an MCTP over PCIe configuration is used to exchange data between the management controller 806 and the NIC card 814.

Figure 9:
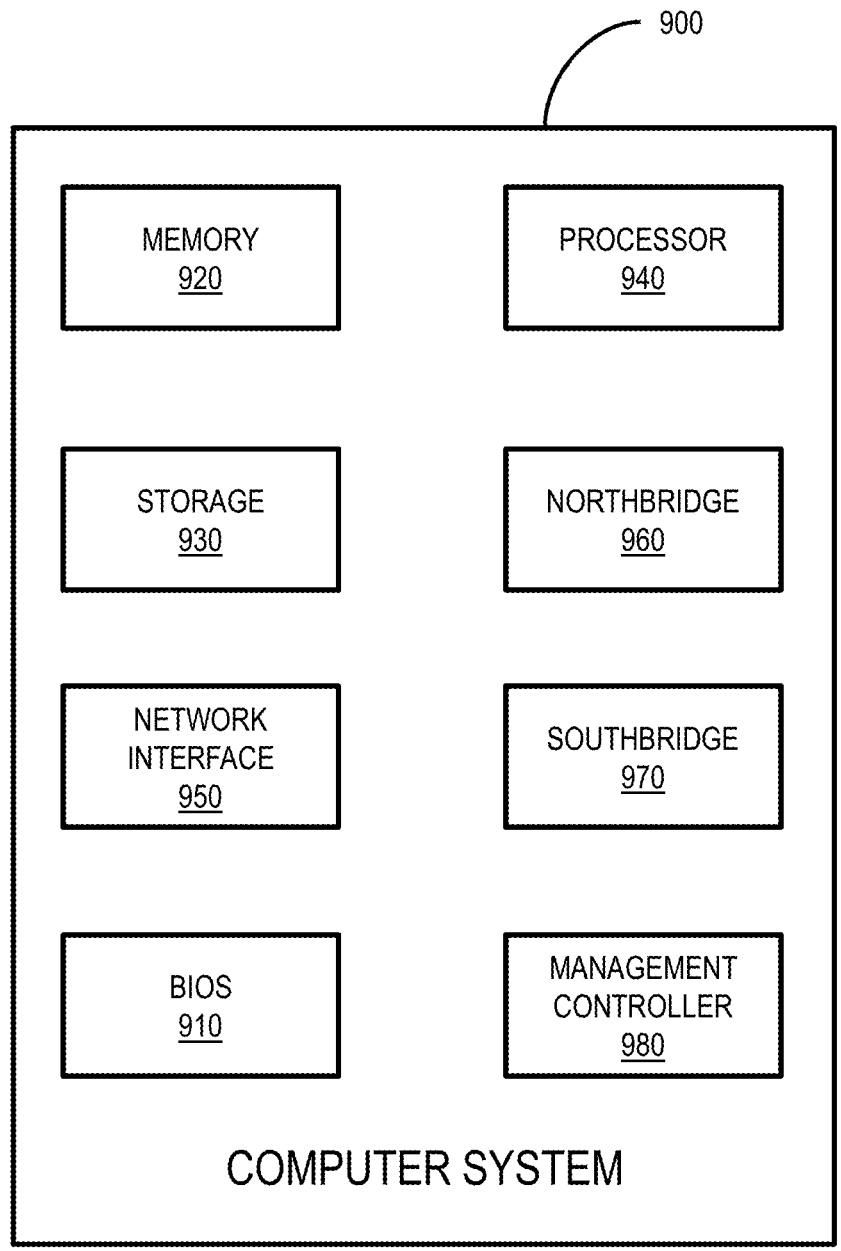
FIG. 9 illustrates a block diagram of an example computer system for implementing the various embodiments of the invention.

FIG. 9 illustrates a block diagram of an example computer system 900. The computer system 900 can include a processor 940, a network interface 950, a management controller 980, a memory 920, a storage 930, a Basic Input/Output System (BIOS) 910, and a northbridge 960, and a southbridge 970.

The computer system 900 can be, for example, a server (e.g., one of many rack servers in a data center) or a personal computer. The processor (e.g., central processing unit (CPU)) 940 can be a chip on a motherboard that can retrieve and execute programming instructions stored in the memory 920. The processor 940 can be a single CPU with a single processing core, a single CPU with multiple processing cores, or multiple CPUs. One or more buses (not shown) can transmit instructions and application data between various computer components such as the processor 940, memory 920, storage 930, and networking interface 950.

The memory 920 can include any physical device used to temporarily or permanently store data or programs, such as various forms of random-access memory (RAM). The storage 930 can include any physical device for non-volatile data storage such as a HDD or a flash drive. The storage 930 can have a greater capacity than the memory 920 and can be more economical per unit of storage, but can also have slower transfer rates.

The BIOS 910 can include a Basic Input/Output System or its successors or equivalents, such as an Extensible Firmware Interface (EFI) or Unified Extensible Firmware Interface (UEFI). The BIOS 910 can include a BIOS chip located on a motherboard of the computer system 900 storing a BIOS software program. The BIOS 910 can store firmware executed when the computer system is first powered on along with a set of configurations specified for the BIOS 910. The BIOS firmware and BIOS configurations can be stored in a non-volatile memory (e.g., NVRAM) 920 or a ROM such as flash memory. Flash memory is a non-volatile computer storage medium that can be electronically erased and reprogrammed.

The BIOS 910 can be loaded and executed as a sequence program each time the computer system 900 is started. The BIOS 910 can recognize, initialize, and test hardware present in a given computing system based on the set of configurations. The BIOS 910 can perform self-test, such as a Power-on-Self-Test (POST), on the computer system 900. This self-test can test functionality of various hardware components such as hard disk drives, optical reading devices, cooling devices, memory modules, expansion cards and the like. The BIOS can address and allocate an area in the memory 920 in to store an operating system. The BIOS 910 can then give control of the computer system to the OS.

The BIOS 910 of the computer system 900 can include a BIOS configuration that defines how the BIOS 910 controls various hardware components in the computer system 900. The BIOS configuration can determine the order in which the various hardware components in the computer system 900 are started. The BIOS 910 can provide an interface (e.g., BIOS setup utility) that allows a variety of different parameters to be set, which can be different from parameters in a BIOS default configuration. For example, a user (e.g., an administrator) can use the BIOS 910 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 980 can be a specialized microcontroller embedded on the motherboard of the computer system. For example, the management controller 980 can be a BMC or a RMC. The management controller 980 can manage the interface between system management software and platform hardware. Different types of sensors built into the computer system can report to the management controller 980 on parameters such as temperature, cooling fan speeds, power status, operating system status, etc. The management controller 980 can monitor the sensors and have the ability to send alerts to an administrator via the network interface 950 if any of the parameters do not stay within preset limits, indicating a potential failure of the system. The administrator can also remotely communicate with the management controller 980 to take some corrective action such as resetting or power cycling the system to restore functionality.

The northbridge 960 can be a chip on the motherboard that can be directly connected to the processor 940 or can be integrated into the processor 940. In some instances, the northbridge 960 and the southbridge 970 can be combined into a single die. The northbridge 960 and the southbridge 970, manage communications between the processor 940 and other parts of the motherboard. The northbridge 960 can manage tasks that require higher performance than the southbridge 970. The northbridge 960 can manage communications between the processor 940, the memory 920, and video controllers (not shown). In some instances, the northbridge 960 can include a video controller.

The southbridge 970 can be a chip on the motherboard connected to the northbridge 960, but unlike the northbridge 960, is not directly connected to the processor 940. The southbridge 970 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the computer system 900. The southbridge 970 can be connected to or can include within the southbridge 970 the management controller 970, Direct Memory Access (DMAs) controllers, Programmable Interrupt Controllers (PICs), and a real-time clock.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computing device, comprising:
   a network interface controller (NIC) card coupled to a data network;
   a central processing unit (CPU); and
   a basic input/output system (BIOS) with a link layer discovery protocol (LLDP) service,
   wherein the CPU is configured for receiving a signal indicating a change at the NIC card and configuring the CPU to initiate a BIOS session in response to the signal,
   wherein BIOS Session is configured to allow the BIOS to perform, via the CPU, operations for the LLDP service comprising transmitting to a data switch of the data network via the NIC card a LLDP packet comprising information for the NIC card based on the change.

2. The computing device of claim 1, wherein the signal comprises a system management interrupt and the BIOS session comprises a system management mode (SMM) of the CPU.

3. The computing device of claim 1, wherein the signal is received from the NIC card.

4. The computing device of claim 1, further comprising a management controller configured for monitoring the NIC card, and wherein the signal is received from management controller.

5. The computing device of claim 1, wherein the BIOS is further configured to transmit to the data switch the LLDP packet comprising information for the NIC card during a boot-up of the computing device.

6. A method in a computing device having a network interface controller (NIC) card coupled to a data network, a central processing unit (CPU), and a basic input/output system (BIOS) with a link layer discovery protocol (LLDP) service, the method comprising the steps of:
receiving, at the CPU, a signal indicating a change at the NIC card; and
initiating, at the CPU, a BIOS session in response to the receiving of signal;
wherein BIOS session is configured to allow the BIOS to perform, via the CPU, operations for the LLDP service comprising transmitting to a data switch of the data network via the NIC card a LLDP packet comprising information for the NIC card based on the change.

7. The method of claim 6, wherein the signal comprises a system management interrupt and the BIOS session comprises a system management mode (SMM) of the CPU.

8. The method of claim 6, wherein the signal is received from the NIC card.

9. The method of claim 6, wherein the computing device has a management controller configured for monitoring the NIC card, and wherein the signal is received from management controller.

10. A computing device, comprising:
a network interface controller (NIC) card coupled to a data network; and
a management controller with a link layer discovery protocol (LLDP) service,
wherein the LLDP is configured for causing the NIC card to route traffic for the NIC card to the management controller, extracting NIC card information from the traffic, and causing the NIC card to transmit to a data switch of the data network, via the NIC card, a LLDP packet comprising the NIC card information.

11. The computing device of claim 10, wherein the NIC card information comprises a NIC card media access control (MAC) address.

12. The computing device of claim 10, wherein the transmitting comprises detecting a trigger event and performing the transmitting in response to the trigger event.

13. The computing device of claim 12, wherein the trigger event comprises at least one of a power off state for the computing device, a power on state for the computing device, or a change at the NIC card.

14. The computing device of claim 10, wherein the NIC card information is transmitted continuously.

15. The computing device of claim 10, wherein the causing comprises establishing a communications session between the management controller and the NIC card for the routing of the traffic.

16. The computing device of claim 15, wherein the communications session between the management controller and the NIC card comprises one of a Network Controller Sideband Interface (NC-SI) over Reduced Media Independent Interface Based Transport (RBT) session, a Management Component Transport Protocol (MCTP) over System Management Bus (SMBus) session, or a MCTP over Peripheral Component Interconnect Express (PCIe) session.

17. A method in a computing device having a network interface controller (NIC) card coupled to a data network and a management controller with a link layer discovery protocol (LLDP) service, the method comprising, performing, via the LLDP service of the management controller, the steps of:
configuring the NIC card to route traffic for the NIC card to the management controller, extracting NIC card information from the traffic, and
transmitting, via the NIC card, a LLDP packet comprising the NIC card information to a data switch of the data network.

18. The method of claim 17, wherein the NIC card information comprises a NIC card media access control (MAC) address.

19. The method of claim 17, wherein the transmitting comprises detecting a trigger event and performing the transmitting in response to the trigger event.

20. The method of claim 19, wherein the trigger event comprises at least one of a power off state for the computing device, a power on state for the computing device, or a change at the NIC card.

21. The method of claim 17, wherein the NIC card information is transmitted continuously.

22. The method of claim 17, wherein the configuring comprises establishing a communications session between the management controller and the NIC card.

23. The method of claim 22, wherein the communications session between the management controller and the NIC card comprises one of a Network Controller Sideband Interface (NC-SI) over Reduced Media Independent Interface Based Transport (RBT) session, a Management Component Transport Protocol (MCTP) over System Management Bus (SMBus) session, or a MCTP over Peripheral Component Interconnect Express (PCIe) session.

* * * * *